J. WISNER.
Car-Track Clearer.
No. 16,623. Patented Feb. 10, 1857.
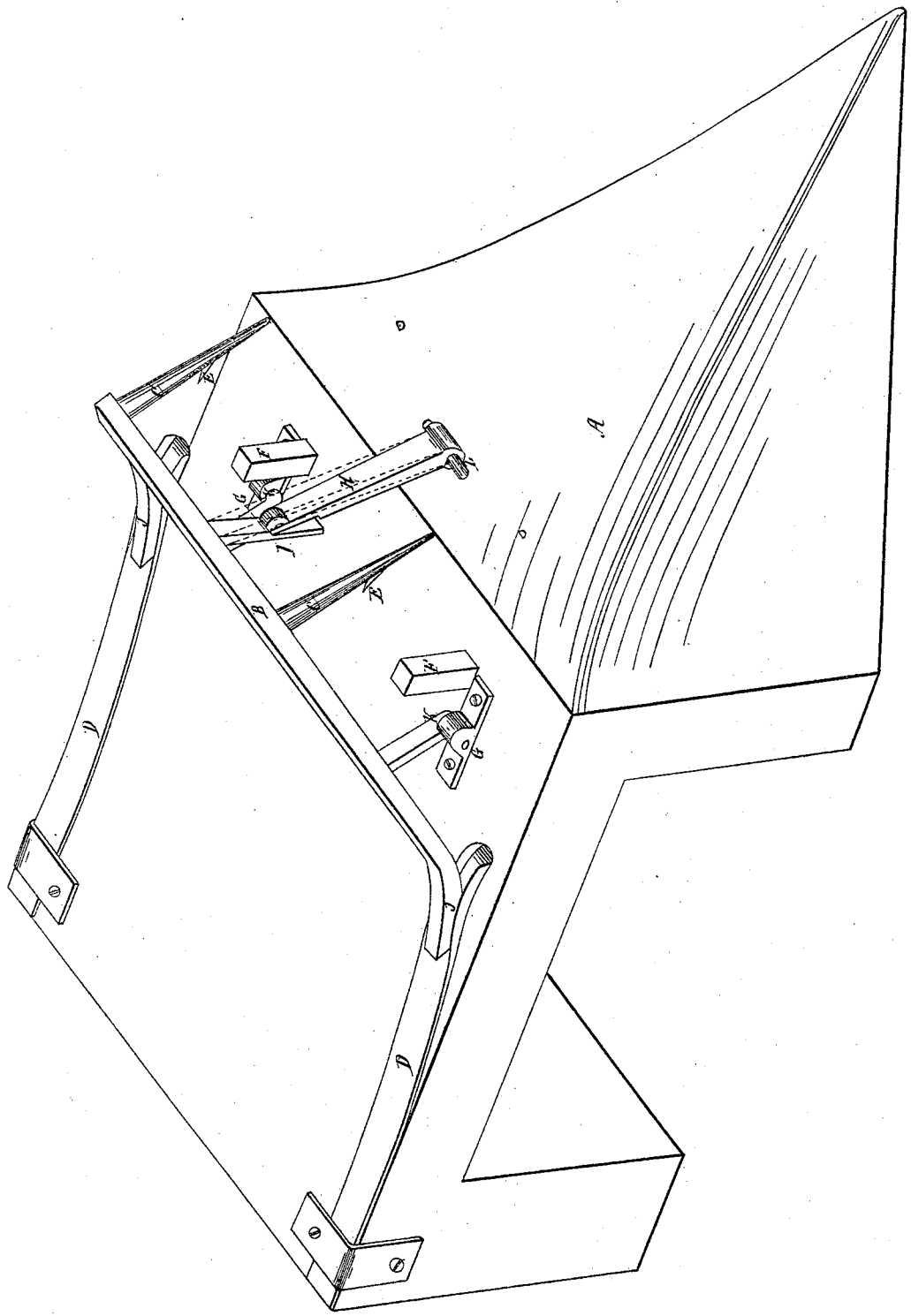

UNITED STATES PATENT OFFICE.

JOEL WISNER, OF AURORA, NEW YORK.

LOCOMOTIVE COW-CATCHER FOR RAILROADS.

Specification of Letters Patent No. 16,623, dated February 10, 1857.

*To all whom it may concern:*

Be it known that I, JOEL WISNER, of Aurora, in the county of Erie and State of New York, have invented a new and useful Improvement in Cow-Catchers to be Applied to Locomotives; and I do hereby declare the following to be a full and exact description thereof, reference being had to the accompanying drawings and to the letters of reference marked thereon.

The nature of my invention consists in placing over and attached to the common cow-catcher a heavy arm or bar operated by a spring, the arm or bar to be supported by a jointed stud or post hung at one end by an eye and staple or hinges, on which the bar rests when set. Said bar to have a knuckle joint in the middle, which will give way and allow the arm to fall should any creature come against it, thereby causing the arm to fall and hold the animal until relieved, thereby preventing the animal from getting on the track and throwing the car off, as is often the case.

To enable others skilled in the art to make and use my invention I will proceed to describe its construction and operation.

A represents the common cow-catcher or fender guard which I do not claim.

B represents the arm, C the barbed spikes or teeth, D the springs which operate on the feet, J, of the arm, G, G, the legs which work on a hinge or journal K.

F, F, are studs or rests for the arm to strike or rest on when the catcher or trap is not set.

H is a hinged stud or knuckle jointed lever hung at the lower end by a staple or pin L in the middle or at I. The stud is formed or the joint is formed by halving the two pieces together with a hinge on the front side and upper end of the lower piece H, making a flexible joint that will just support the arm when the two pieces are on a straight line, with the arm, B, resting on it, when set, the upper end of the stud being pointed or sharpened and having a small stepping in the under side of the arm to keep it in place. Should an animal be caught or run onto the fender or guard A, it would come directly in contact with the lower part of the stud H, causing it to cripple at the joint I, thereby letting the arm B, projecting over the forward end beam of the locomotive far enough to strike over the animal or other obstruction which might come in contact with the stud H to spring the catcher, which would prevent its falling back on the track, the springs D being of sufficient strength to hold the teeth and arm secure to its place when sprung to prevent the escape of an animal in its struggling.

Having thus fully described my new and improved cow-catcher, what I claim as my invention and desire to secure by Letters Patent is—

1. I claim the bar or jaw B, legs G feet J and teeth C when operated by the springs D or their equivalent in combination with the forward end beam of the locomotive.

2. I claim the stud H and joint I, in combination with the bar B, when constructed and operated substantially in the manner and for the purposes described.

JOEL WISNER.

Attest:
 JOHN S. HOLLINGSHEAD,
 W. A. BOSS.